US006703067B2

(12) United States Patent
Moon et al.

(10) Patent No.: US 6,703,067 B2
(45) Date of Patent: Mar. 9, 2004

(54) COATING METHOD WITH IMPROVED COATING UNIFORMITY BY CHOICE OF SURFACTANT COMPOSITION

(75) Inventors: Alice G. Moon, Penfield, NY (US); F. Miguel Joos, Pittsford, NY (US); Alan R. Pitt, Sandridge (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/178,264

(22) Filed: Jun. 24, 2002

(65) Prior Publication Data

US 2003/0235647 A1 Dec. 25, 2003

(51) Int. Cl.[7] ............................ B05D 5/00; G01N 13/02

(52) U.S. Cl. ............................ 427/8; 427/402; 427/420; 73/61.43; 73/64.48

(58) Field of Search ............................ 427/8, 420, 402; 73/61.43, 64.48

(56) References Cited

U.S. PATENT DOCUMENTS

| | | | | |
|---|---|---|---|---|
| 4,287,240 A | | 9/1981 | O'Connor | 427/402 |
| 5,114,759 A | | 5/1992 | Finnicum et al. | 427/420 |
| 5,773,204 A | | 6/1998 | Baumlin | 430/449 |
| 5,824,887 A | * | 10/1998 | Baumlin et al. | 73/64.48 |
| 5,871,821 A | * | 2/1999 | Kondo et al. | 427/420 |
| 5,976,630 A | | 11/1999 | Korokeyi et al. | 427/420 |

* cited by examiner

*Primary Examiner*—Katherine A. Bareford
(74) *Attorney, Agent, or Firm*—Mark G. Bochetti

(57) ABSTRACT

A method for measuring the dynamic surface tension (DST) of a proposed outer layer of a liquid composition, to be curtain or slide hopper coated, over a range of surfactant levels to determine the surfactant concentration which produces the maximum resistance to air currents. Measurements are made by the Wilhelmy Blade Method, in which a surface of a pool of composition to be measured is placed in contact with the lower edge of a suspended blade. The static method is modified such that the surface of the composition touching the blade is continually refreshed to simulate the formation of fresh curtain surface by pumping the composition upwards through an open cylinder and allowing the composition to spill over the edges ("overflowing weir"). The bulk surfactant concentration providing maximum resistance to coated streakiness or mottle is highly correlated with the concentration providing maximum surface tension gradients in the overflowing weir apparatus. Thus, for new or non-optimized air-contact layers, the optimum surfactant concentration can be predicted quickly and inexpensively through off-line measurement of surface tension using the overflowing weir technique.

9 Claims, 14 Drawing Sheets

COATING METHOD WITH IMPROVED COATING UNIFORMITY BY CHOICE OF SURFACTANT COMPOSITION

FIELD OF THE INVENTION

The present invention relates generally to a method for coating a liquid composition onto a substrate surface to form a coating thereon comprising one or more layers. More particularly, the present invention relates to a method for formulating one or more the liquid compositions forming such coating layers, which maximizes the resistance of such compositions to variations in thickness of the layers formed therewith.

BACKGROUND OF THE INVENTION

It is well known to coat a moving web or substrate with a composite layer of liquid coating composition. The composite layer may comprise one or more layers simultaneously coated onto the moving web. Coating can be performed by a variety of methods including, for example, curtain coating, slide bead coating, and extrusion hopper coating with more than one slot. In the manufacture of various types of coated web substrates, a serious problem can arise as a result of variations in thickness of the coated composition in the direction transverse to the coating direction (the direction of travel of the web through the coating apparatus). Such variations are referred to in the art as "running streaks." In some coating applications, for example, in the manufacture of photographic films and papers, relatively slight variations in thickness, on the order of 1% or less, can render the coating unacceptable.

Such streaks may be formed, from a variety of well-known causes, at any point where the coated composition is still liquid. For example, composition may be caused to move laterally, creating a local increase in composition thickness and leaving a corresponding local decrease in thickness. Thus the practical effect of lateral flow is the sum of the thickness increase and decrease.

Many photographic products are manufactured by a coating technique known in the art as "curtain" coating, wherein liquid composition (also referred to herein as "emulsion") is extruded from a coating die having a linear coating lip and falls free as a liquid sheet or curtain under gravity onto a substrate passing beneath the die, where it forms a coated layer or layers on the substrate. As is well known in the coating art, the curtain is vulnerable to deformation by air currents impinging on the curtain. Many schemes are known in the art for mechanically shielding the curtain, such as providing close-fitting screens on either side of the curtain or enclosing the die and curtain in a stagnant air chamber. See, for example, U.S. Pat. No. 5,114,759 to Finnicum, et al, U.S. Pat. No. 4,287,240 to O'Connor, and U.S. Pat. No. 5,976,630 to Korokeyi, et al. None of these schemes can be totally successful because of practical considerations such as turbulence caused by entry and exit of the substrate to the chamber and condensation, which can drip from chamber surfaces onto the composition. Further, it has been shown that even very low velocity air currents, on the order of 15 feet per minute or less, can cause unacceptable curtain deformation.

A complementary approach to mechanical shielding is to add surfactant to compositions to be coated to increase resistance to thickness deformation caused by flow of the coating on the web. Many compositions consist of multiple individual layer-forming compositions (referred to herein as "layers" even before the actual point of coating onto the substrate) delivered simultaneously as a coating pack or composite layer from a multiple slot coating die; thus layer compositions exposed to air in a falling curtain may differ between the front side and the back side of the curtain, and each such layer may include surfactant to optimize resistance of the overall coating pack to streak formation. See, for example, U.S. Pat. No. 5,773,204 toBaumlin.

For the purpose of immobilizing (preventing flow of the coating on the web ) and solidifying the coated layers after the coating point, independently of the means used to apply these layers to the support, the coated layers are subjected to air currents that either set (which increases viscosity) and dry them, or simply dry them. The immobilization process typically is done over a period of seconds, during which the coating is subjected to the impact of the air currents. When these currents indirectly impinge on the coated layers, they can lead to thickness variations in the coated layers in the way of a random blotchy pattern referred to in the art as "mottle". More severe thickness variations can be caused by air currents impinging directly on the coated layers, such as in the form of impinging air jets typically used to produce substantially higher heat transfer rates and accelerate the immobilization rate. The corresponding thickness variations appear as straight lines of some width, which are known in the art as "streaks".

A difficulty in the art of formulating compositions for coating is determining the optimum concentration of surfactant. Presently, the amount selected is determined empirically by trial and error on representative product layers on a pilot coating machine, or with real product layers on a production coating machine. This approach is known to be very time consuming and costly, especially with regard to the generation of waste or sub-optimal coatings.

Thus, there is a need for a method for simple, off-line determination of the optimum level of surfactant for a coating composition.

SUMMARY OF THE INVENTION

It is therefore an object of the present invention to provide an improved method for predicting the optimal concentration of surfactant for a coating composition.

It is a further object of the invention to provide an improved method wherein simple, inexpensive off-line determinations may be correlated with pilot-scale trial coatings to predict streak or mottle-resistance optima.

Briefly stated, the foregoing and numerous other features, objects and advantages of the present invention will become readily apparent upon a review of the detailed description, claims and drawings set forth herein. These features, objects and advantages are accomplished by measuring the dynamic surface tension (DST) of a proposed liquid coating composition over a range of surfactant levels to determine the surfactant concentration that produces the maximum surface tension gradient. Measurements are made by a method related to the Wilhelmy Blade Method, in which a surface of a static pool of composition to be measured is placed in contact with the lower edge of a suspended blade, and the force required to lift the blade from the surface is determined. The static method is modified such that the surface of the composition touching the blade is continually refreshed, to simulate the formation of fresh curtain surface, by pumping the composition upwards through an open cylinder and allowing the composition to spill over the edges ("overflowing weir"). The bulk surfactant concentration providing maximum resistance to coating streakiness and mottle is highly correlated with the concentration providing maximum surface tension gradients in the overflowing weir. Thus, for new or non-optimized air-contact layers, the optimum surfactant concentration can be predicted quickly and inexpensively through off-line measurement of surface tension using an overflowing weir technique. The technique is suitable for optimizing compositions comprising each of the outer layers of a multiple-layer coating pack in a curtain coating operation, as well as for those compositions comprising the top layer of a multi-layer composite coated in a bead or curtain coating operation. Although much of the method was developed in the context of the curtain itself in a curtain coating operation, surprisingly, it has been found that the method yields a good result for coating processes in general, including, for example, curtain coating, slide bead coating, and extrusion or slot coating, regardless of where the air disturbance occurs. The disturbance may be on the slide surface, in the curtain, or on the web in chill setting or early drying of the coating. In addition, it has been found that the method can also be applied to non-aqueous coatings. Further optimization for specific coating operations and coating formulae can be optimized empirically by those skilled in the art.

DETAILED DESCRIPTION OF THE INVENTION

Figure 1:
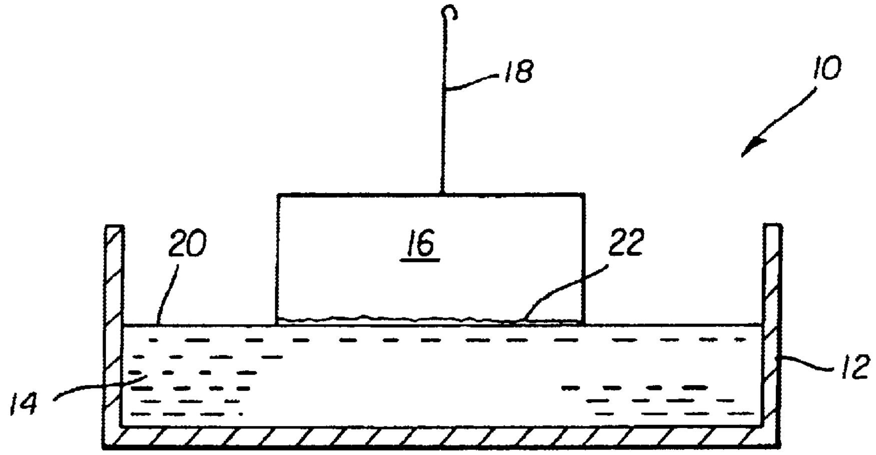
FIG. 1 is an elevational, partially sectioned schematic of prior art apparatus for determining surface tension of a static liquid surface at equilibrium by the Wilhelmy Blade Method.

Turning first to FIG. 1 there is schematically depicted a prior art apparatus 10 for measuring static surface tension by the Wilhelmy Blade Method. Apparatus 10 includes a shallow vessel 12 opening upwards and containing a static pool 14 of liquid composition to be measured. A blade 16 having height and width but negligible thickness is suspended by hook 18 from a force measurement apparatus (not shown), for example, a beam balance. Blade 16 is brought into contact with the free surface 20 of pool 14 such that the composition wets the lower edge of the blade, forming a meniscus 22. The force required to lift the blade from contact with the composition is then measured, which force is proportional to the static surface tension (SST) of the composition.

Figure 2:
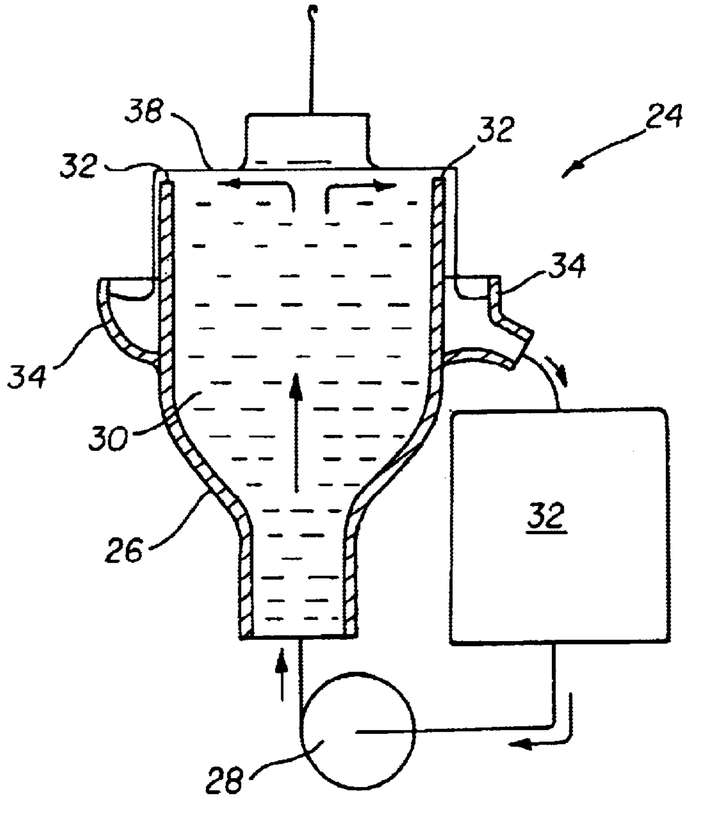
FIG. 2 is an elevational, partially sectioned schematic showing a prior art overflowing weir apparatus for determining dynamic surface tension of a constantly refreshed liquid surface by the Wilhelmy Blade Method.

Referring next to FIG. 2, a dynamic surface tension measuring apparatus 24 is schematically depicted. A vessel 26 is continuously fed from below by pump 28 to thereby fill the vessel 26 with liquid 30. Typically, the diameter of vessel 26 is about 3.8 cm, and the composition is fed to vessel 26 at a flow rate of 8–10 cc/sec, which produces a rate of surface extension similar to that of a free-falling curtain of the same composition during curtain coating from a hopper. The composition continuously overflows the upper edge 32 (the "weir") of vessel 26, flows down the outside of vessel 26 and into a circumferential gutter 34. Liquid collected in circumferential gutter 34 is returned to reservoir 36, which is the source or reservoir supplying pump 28 such that the liquid can be recirculated back to vessel 26. Thus, surface 38 of the liquid within vessel 26 expands continuously. The increased surface tension resulting from the continuous depletion of surfactant in the expanding area, as measured by the Wilhelmy Blade Method, is referred to herein as the dynamic surface tension (DST).

Although the following understanding is not presented as fact for purposes of the invention, it is a working hypothesis, which is supported by the facts as presently understood. As composition tends to be displaced laterally, due for example to impinging turbulent air, creating adjacent thicker and thinner areas, the surface in the thinner area is stretched and the surface in the thicker area is compressed. Compositions having a moderate level of bulk surfactant, as discussed more fully below, experience a substantially instantaneous higher surface concentration of surfactant molecules in the thicker, compressed-surface area and a corresponding lower surface concentration in the thinner, stretched-surface area. Such a concentration difference, however, creates a surface tension gradient, which is a restorative force acting to counter the flow, thus countering the tendency to form thickness streaks. Dynamic surface tension $\sigma$ (also referred to herein as DST) is a direct function of the logarithm of the concentration of surfactant at the free surface, which concentration is changed (dC) when a surface is stretched or compressed to change the surface area (dA). Surface tension gradients are maximized when $d\sigma/dA$ is maximized.

Two important parameters affecting the surface's ability to form surface tension gradients, and thus its ability to resist formation of streaks and mottle by air currents, are the bulk concentration of surfactant in the composition and the physical mechanisms of surfactant transfer from the bulk to the surface of the composition. First, if the bulk concentration is too high, the transfer mechanisms of surfactant to the surface are very rapid and therefore the surfactant fails to produce significant surface tension differences, thereby preventing the intended leveling action by surface tension gradients. Second, if the bulk concentration is too low, only small differences in the surfactant surface concentration adsorbed to the free surface can be established. The resulting surface tension differences (and their gradients) are also small and therefore sub-optimal for resisting the effects of air currents on the coated layers. Thus, an optimal bulk concentration of surfactant is one in which the associated surface surfactant level is high enough to establish significant differences in surface tension, but is low enough to prevent interference from bulk diffusion and adsorption to the surface during the time period of interest. The time period of interest begins with the formation of the multilayer structure of the coating and extends to the point in time when the coating is immobilized.

Figure 3:
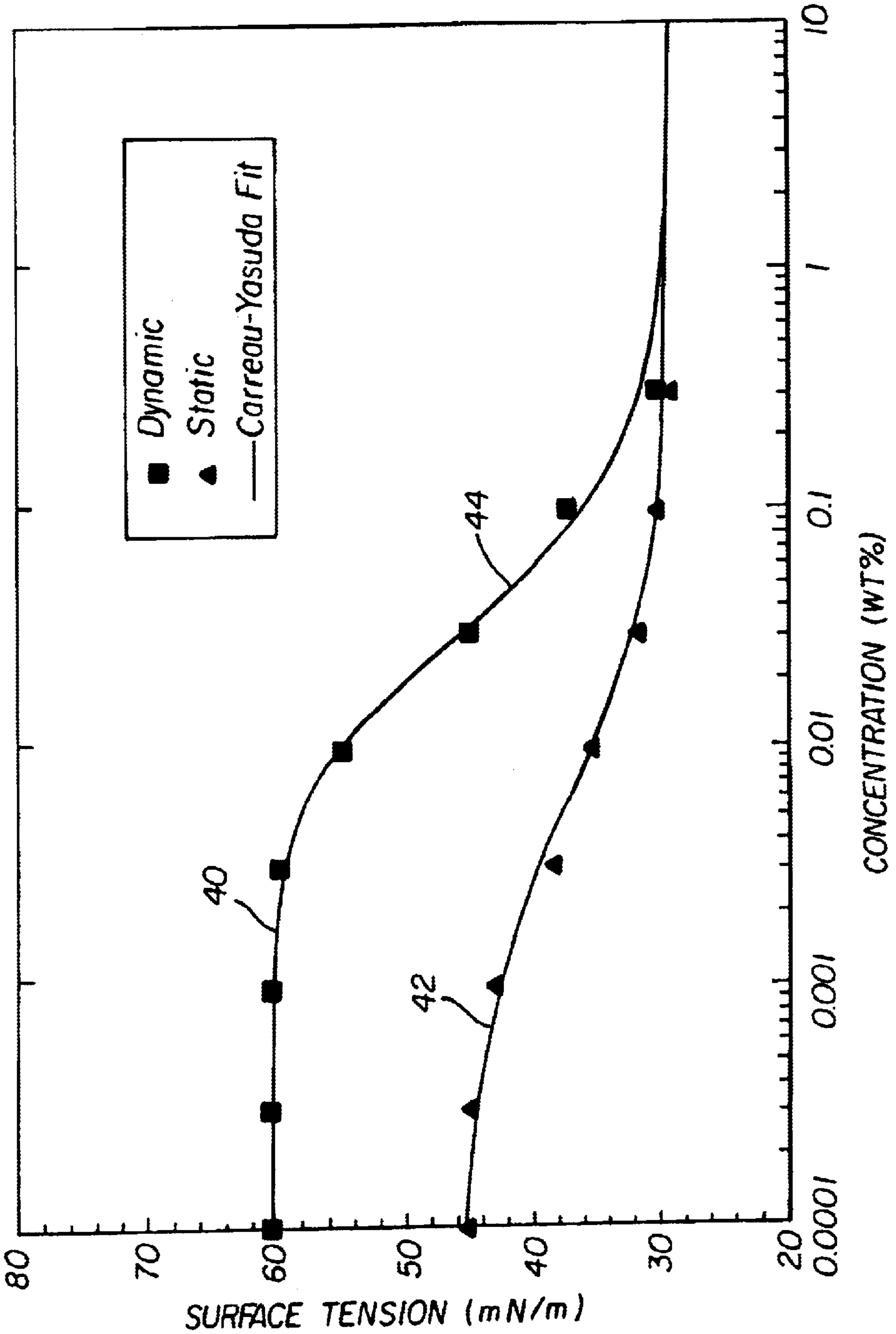
FIG. 3 is a graph showing two curves of static and dynamic surface tension of a gelatin composition as a function of the logarithm of the concentration of a surfactant A, the curves representing the system response when measured by the apparatus shown in FIGS. 1 and 2, respectively (where the commercial names of surfactants A through E are given in the Table)

Since increasing surface area decreases the surface concentration, and since the surface concentration is also a function of the bulk concentration, it is useful to examine DST as a function of bulk surfactant concentration. In FIG. 3 two sets of measurements are shown of surface tension of an aqueous gelatin solution over a range of concentrations of a first surfactant. The upper curve 40 represents DST and the lower curve 42 represents SST. The DST curve is of greater interest for the present invention. The dynamic surface tension data plotted against the logarithm of bulk surfactant concentration has a reverse "S" shape. The curves may be conveniently generated by fitting the determined data points to any of several best-fit algorithms, for example, least squares of an equation of similar form to the Carreau equation used to describe rheological behavior in liquids:

$$\frac{\sigma - \sigma_\infty}{\sigma_o - \sigma_\infty} = \frac{1}{[1 + (\lambda c)^a]^{\frac{(1-n)}{a}}} \quad (1)$$

where

| | |
|---|---|
| $\sigma$ | dynamic surface tension |
| $\sigma_o$ | maximum dynamic surface tension (attained in the absence of surfactant) |
| $\sigma_\infty$ | minimum dynamic surface tension (attained in the presence of an over saturation of surfactant) |

-continued

| | |
|---|---|
| c | bulk surfactant concentration |
| $\lambda$ | fitted parameter |
| a | fitted parameter |
| n | slope parameter determined by fitting data |

Surface concentration cannot be readily measured directly, but its effect can be observed because of its relationship to bulk concentration. Thus curve 40 really represents the effect of surface concentration on surface tension, although it is plotted as a function of bulk concentration. The surface tension gradient can be represented as the slope of curve 40, the minimum value of the slope occurring at the inflection point 44.

Figure 4:
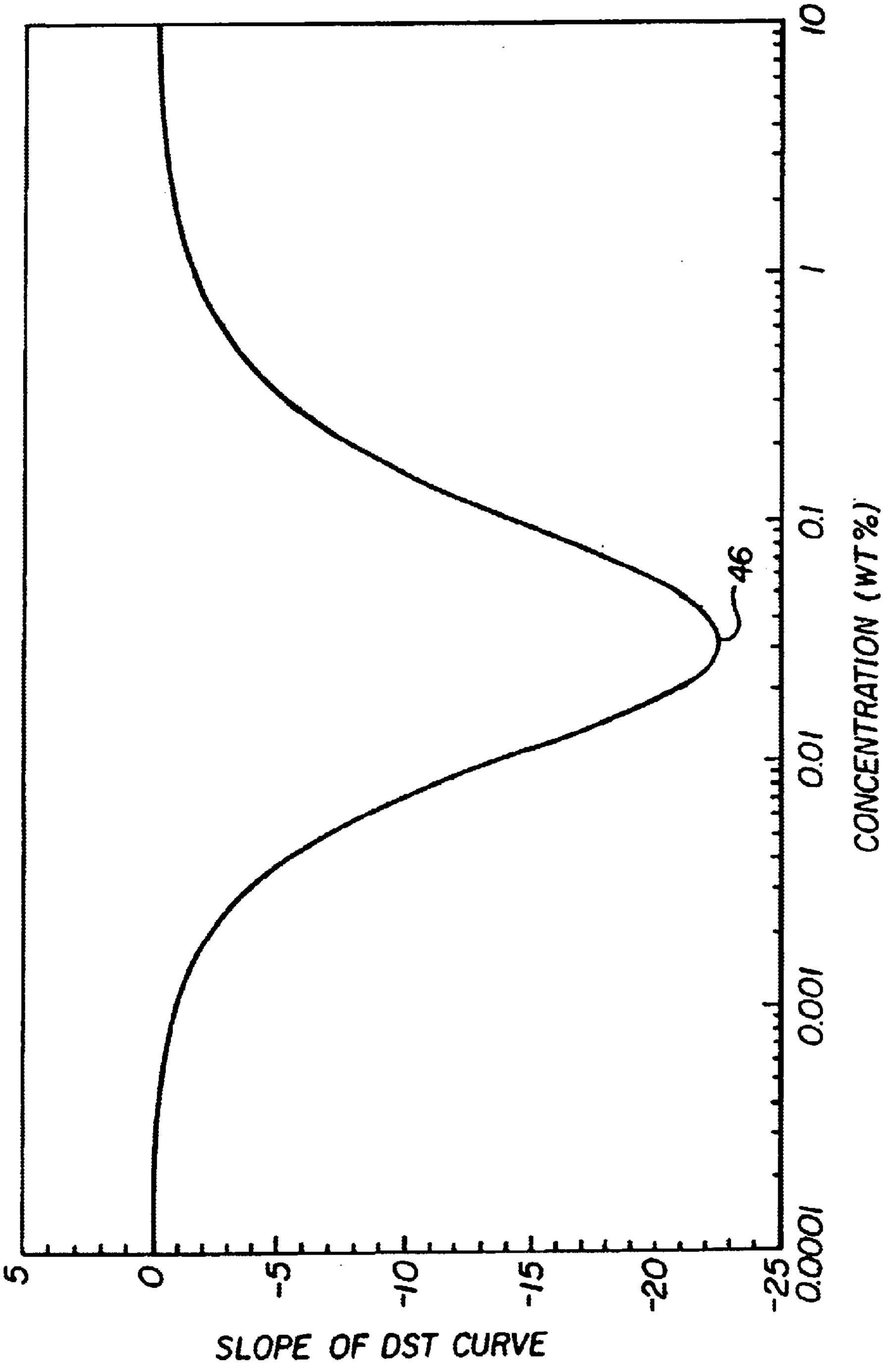
FIG. 4 is a graph of the instantaneous slope of the dynamic surface tension curve shown in FIG. 3, as a function of the logarithm of the concentration of surfactant A.

The values of the slope for the DST curve 40 shown in FIG. 3 may be plotted against concentration, as shown in FIG. 4. The steepest or maximum slope of the curve in FIG. 3 occurs at the curve minimum 46, in FIG. 4, and represents the surfactant concentration providing the largest surface tension gradients to the system. The terms "steepest slope" and "maximum slope" as used herein are intended to refer to the largest absolute value of the rate of change. In accordance with the above-described hypothetical mechanism, this concentration should provide maximum resistance to surface-deforming forces. Following common use, the surfactant concentration at which the curve minimum occurs in any plot like that of FIG. 4, is referred to herein as the surfactant concentration at which surface tension gradients are maximized. Furthermore, all references to maximum, optimum or largest surface tension gradients refer to this surfactant concentration.

Figure 5:
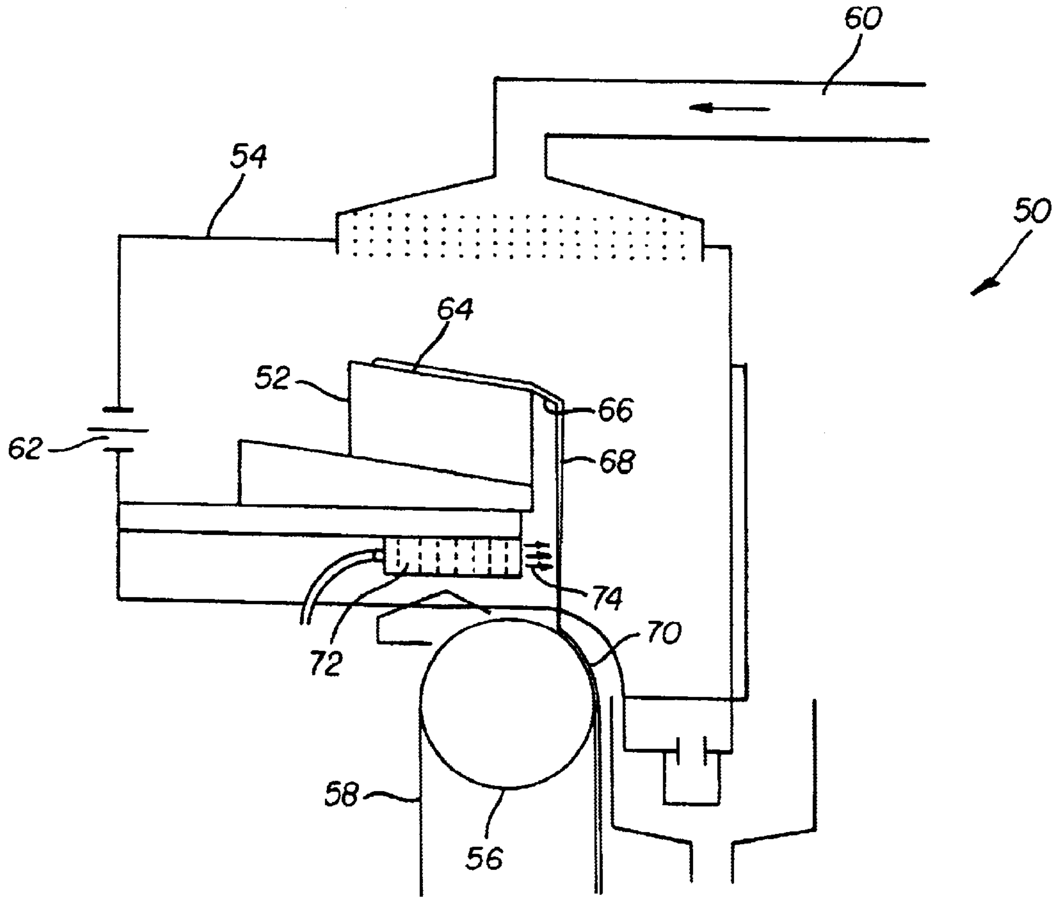
FIG. 5 is a side elevational, cross-sectional schematic view of a streak-propensity testing device, showing a curtain coating apparatus and an air current generator disposed for controllably blowing air onto the falling curtain.

The method of the present invention is tested by curtain coating the same compositions over a range of bulk surfactant concentrations under conditions of controlled imposed air disturbance, and evaluating the coatings for resistance to such disturbance. FIG. 5 shows an exemplary apparatus 50 for making such coatings. A coating die 52, also known as a coating hopper, having a predetermined composition delivery width, is positioned within an enclosure 54 a above a coating backing roller 56 around which a web 58, having a width greater than die delivery width, is conveyed to be coated. Enclosure 54 preferably is provided with a low-velocity baffled air supply and exhaust ports 60,62 to prevent condensation within the enclosure 54. A coating composition 64 to be tested is provided to die 52 at a controlled flow rate from a solution delivery system (not shown) in known fashion. Composition 64 falls from die lip 66 as a free-falling curtain 68 that impinges on web 58 to form a coated layer or composite layer 70. Below die 52 is mounted an air disturbance generator 72 through which controlled air currents 74 can be impinged onto free-falling curtain 68. Coatings made with apparatus 50 are dried conventionally in dryers (not shown).

Figure 6:
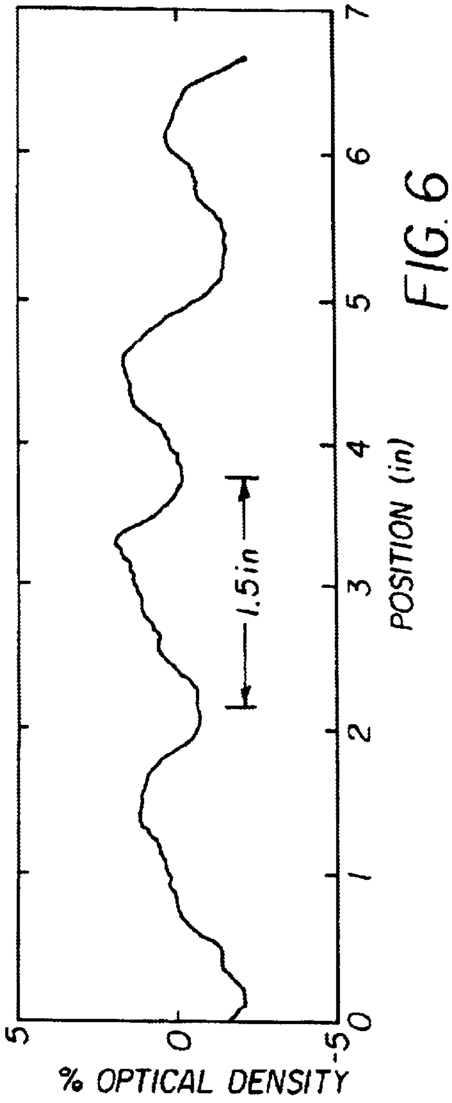
FIG. 6 is a plot of widthwise percent change in optical density of a representative coating made on the apparatus shown in FIG. 5.
Figure 7:
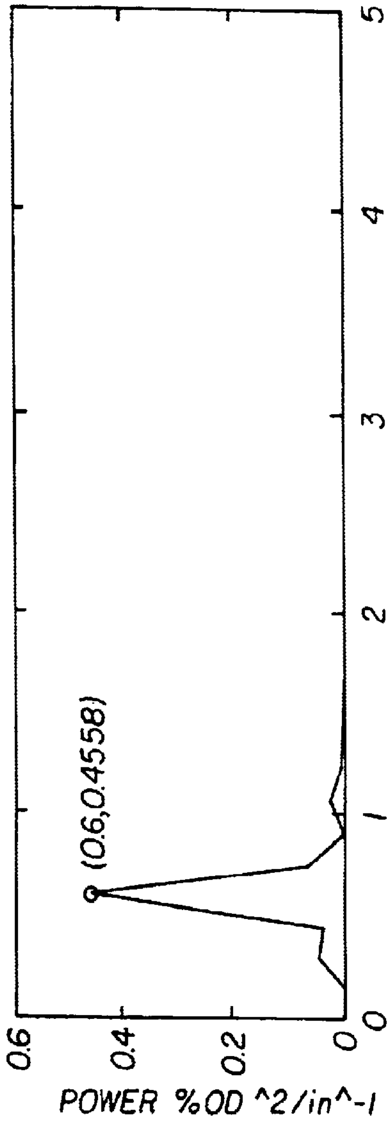
FIG. 7 is a power spectral density graph of the density data shown in FIG. 6.

Coatings may be analyzed for widthwise variation in optical density, as shown in FIG. 6, and a power spectral density determined by conventional analysis, as shown in FIG. 7. Optical density is directly proportional to physical thickness in accordance with Beer's Law. The power value is a measure of the variance of optical density with distance and is calculated from the power spectrum over the frequency range of interest (50–110 Hz). This frequency range represents broad streakiness on the order of 1.80 to 4.25 cm in wavelength. The square root of the average variance in the 50 to 110 Hz band, expressed as a percentage ("% optical density" in the examples shown) is the uniformity measure of interest for comparison of surfactant behavior. A higher % optical density value indicates a less uniform coating.

Figure 8:
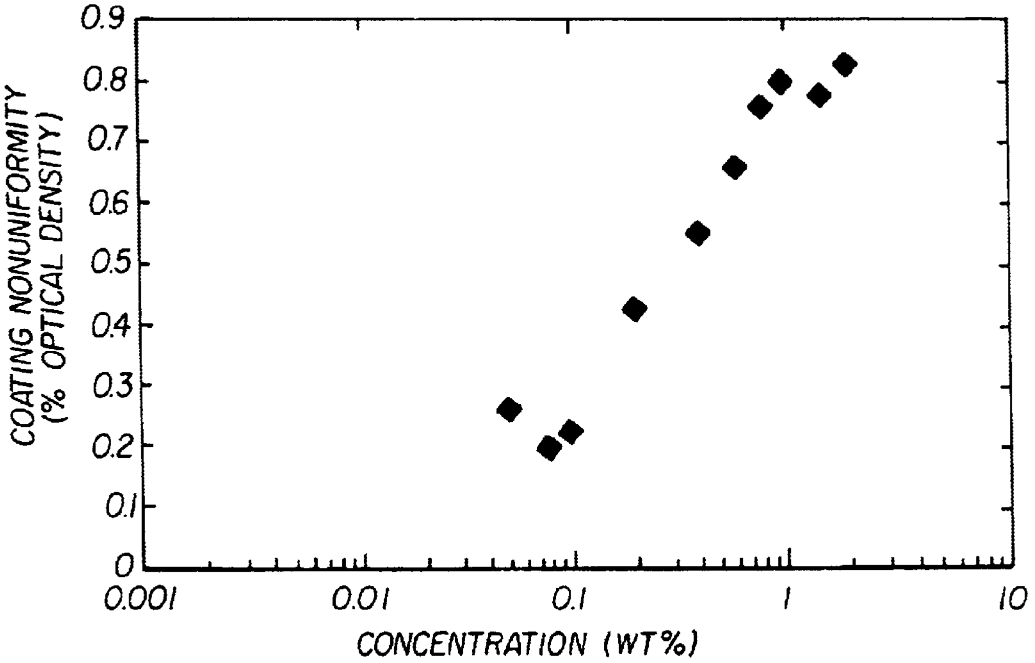
FIG. 8 is a plot of percent variance in optical density of a gelatin composition as a function of the logarithm of the concentration of surfactant A, when coated via the apparatus shown in FIG. 5.
Figure 9:
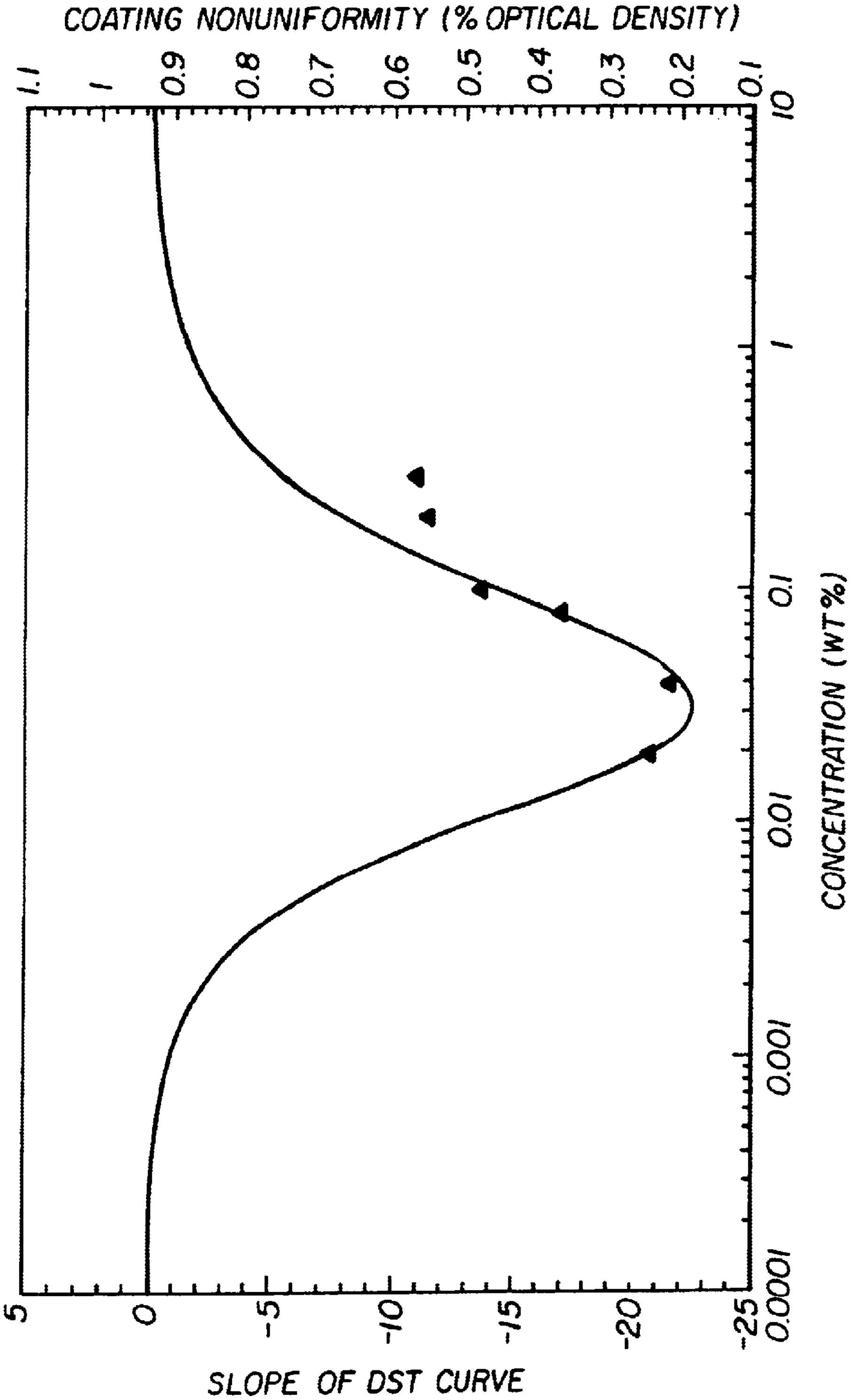
FIG. 9 is an overlay of the slope of the curve for surfactant A, shown in FIG. 4, and the optical density variance measurements, shown in FIG. 8, showing high correlation of the minima of both measurements.

Power values for the range of coatings noted above are plotted as a function of their individual bulk concentrations of surfactant, as shown in FIG. 8. When the data in FIGS. 4 and 8 are superimposed, as shown in FIG. 9, it can be seen that the compositions having the largest surface tension gradient have a very high correlation to the compositions having the lowest variation in coating non-uniformity. Thus, optimizing surface tension gradients is an excellent predictor for maximizing the streak-formation resistance of a composition.

Figure 10:
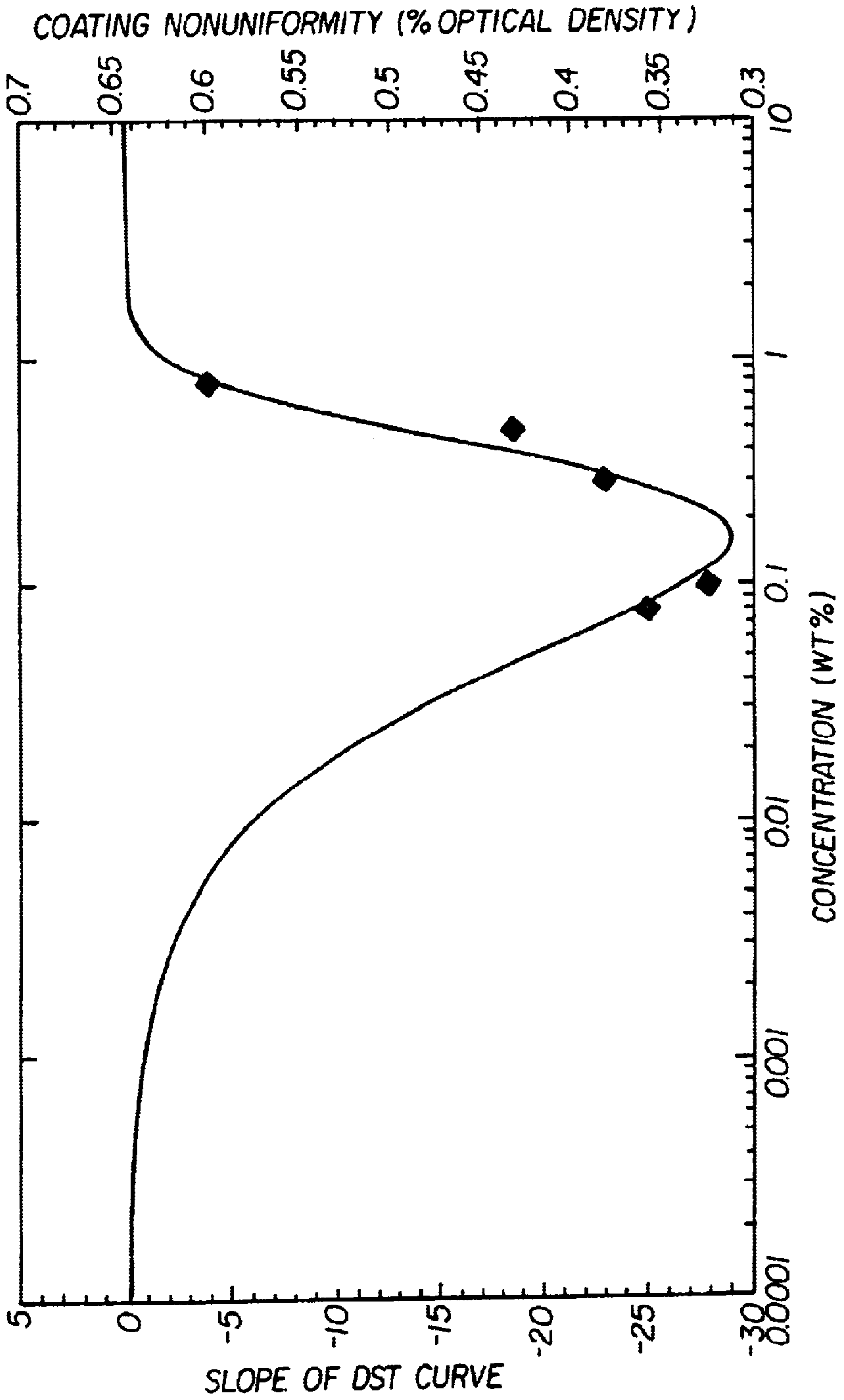
FIG. 10 is an overlay like that shown in FIG. 9, determined for surfactant B.
Figure 11:
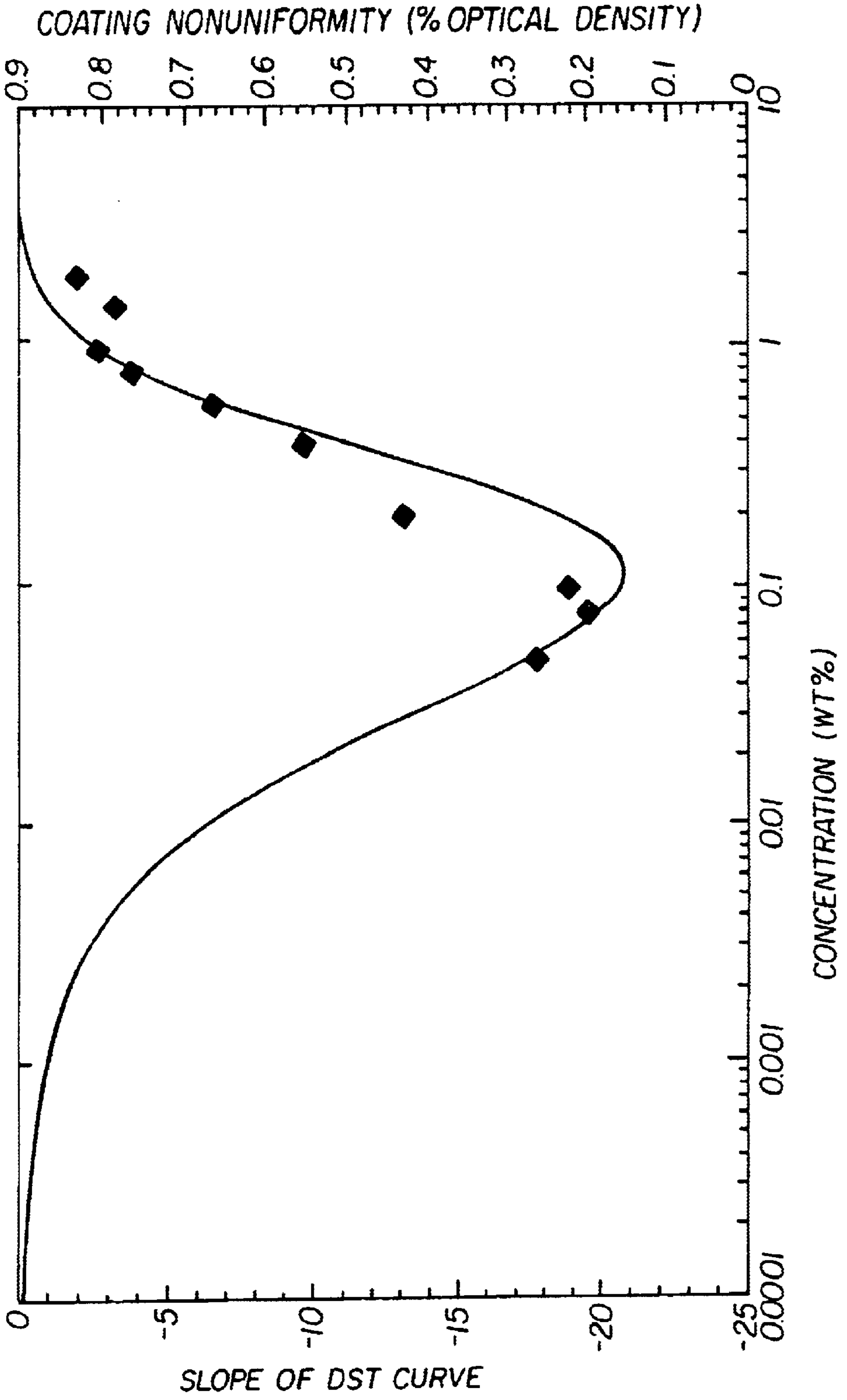
FIG. 11 is an overlay like that shown in FIG. 9, determined for surfactant C.
Figure 12:
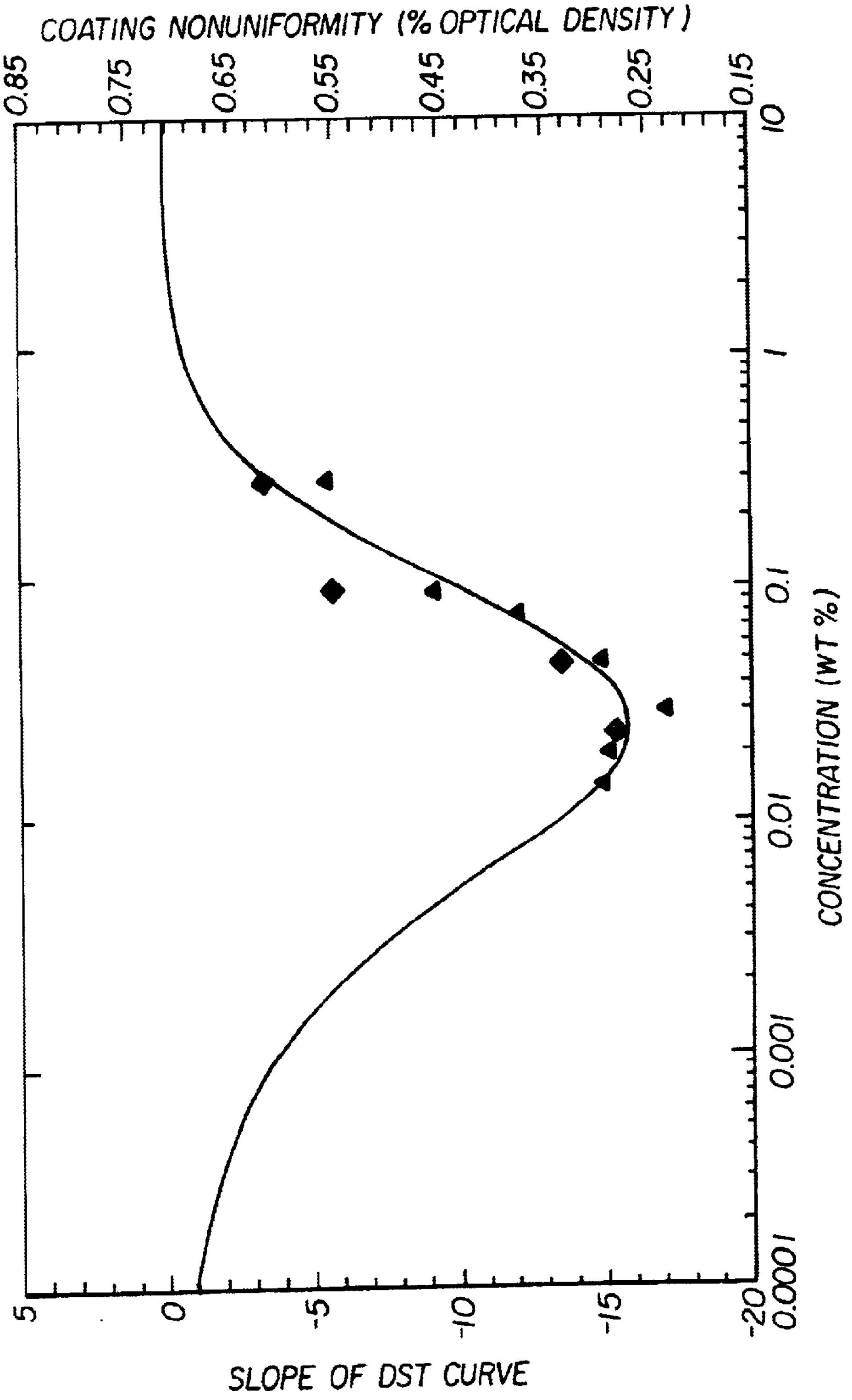
FIG. 12 is an overlay like that shown in FIG. 9, determined for surfactant D.

FIGS. 10–12 show similar high levels of correlation, and therefore predictability, for four other gelatin compositions containing four different surfactants.

Figure 13:
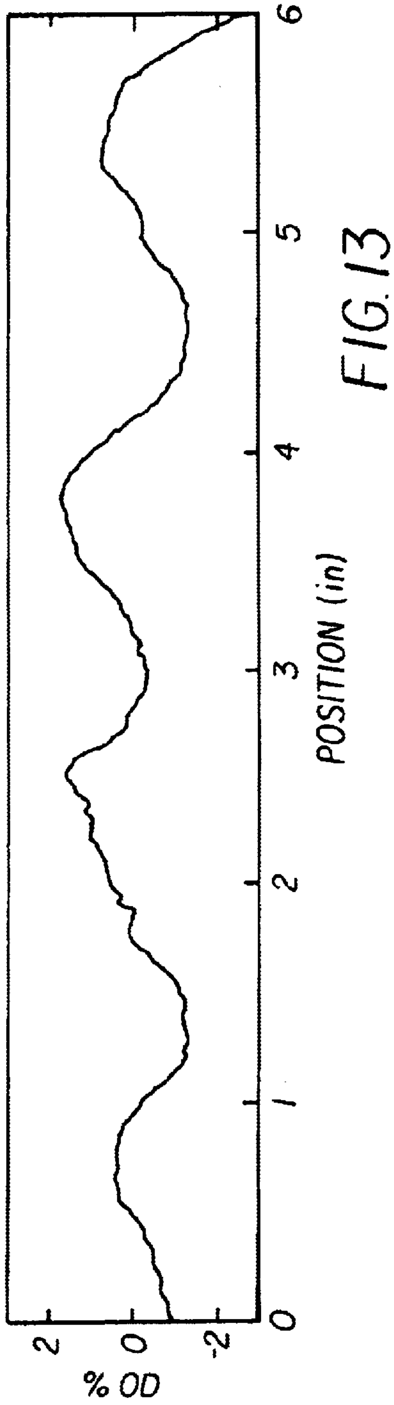
FIG. 13 is a widthwise measurement of percent variation in optical density of a non-optimized photographic product coated via the apparatus shown in FIG. 5.
Figure 14:
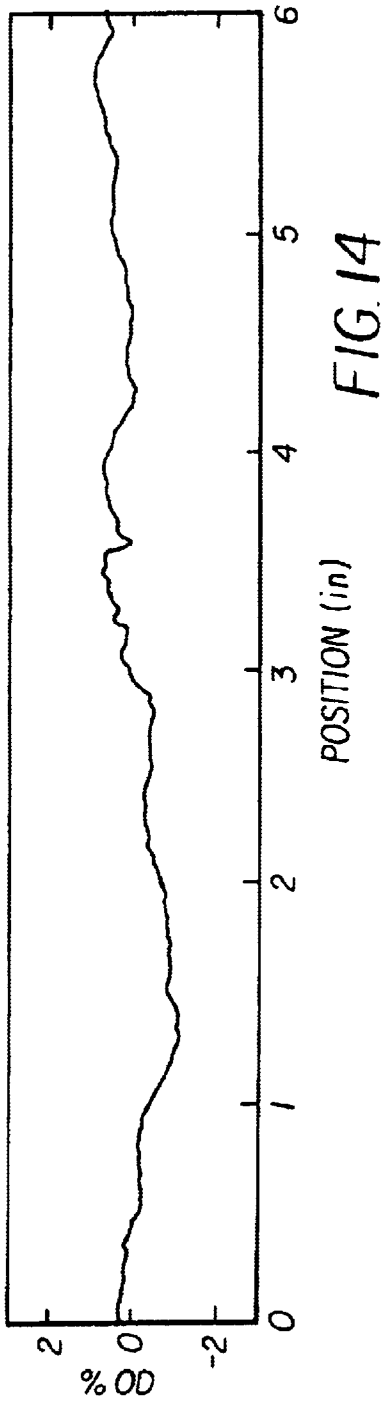
FIG. 14 is a widthwise measurement like that shown in FIG. 13 for the same product after the surfactant level was optimized in accordance with the invention.

For confirmation, the method of the present invention was tested. A test photographic product made with the method of the present invention was compared with a prior art version of the product. FIG. 13 shows the widthwise uniformity of the existing product when coated via apparatus 50 (see FIG. 5). FIG. 14 shows the improvement in widthwise optical density uniformity when the surfactant concentration in the test product was optimized in accordance with the present invention.

The method of the present invention has also been tested on wet coatings, applied to a moving substrate, which have been disturbed by blowing air over them, and the correlation with the method of this invention is also very good. In both experiments described below, the coating was applied to the substrate using the slide coating method. Thus, the method of the present invention does not depend on the multi-layer coating method employed.

Figure 15:
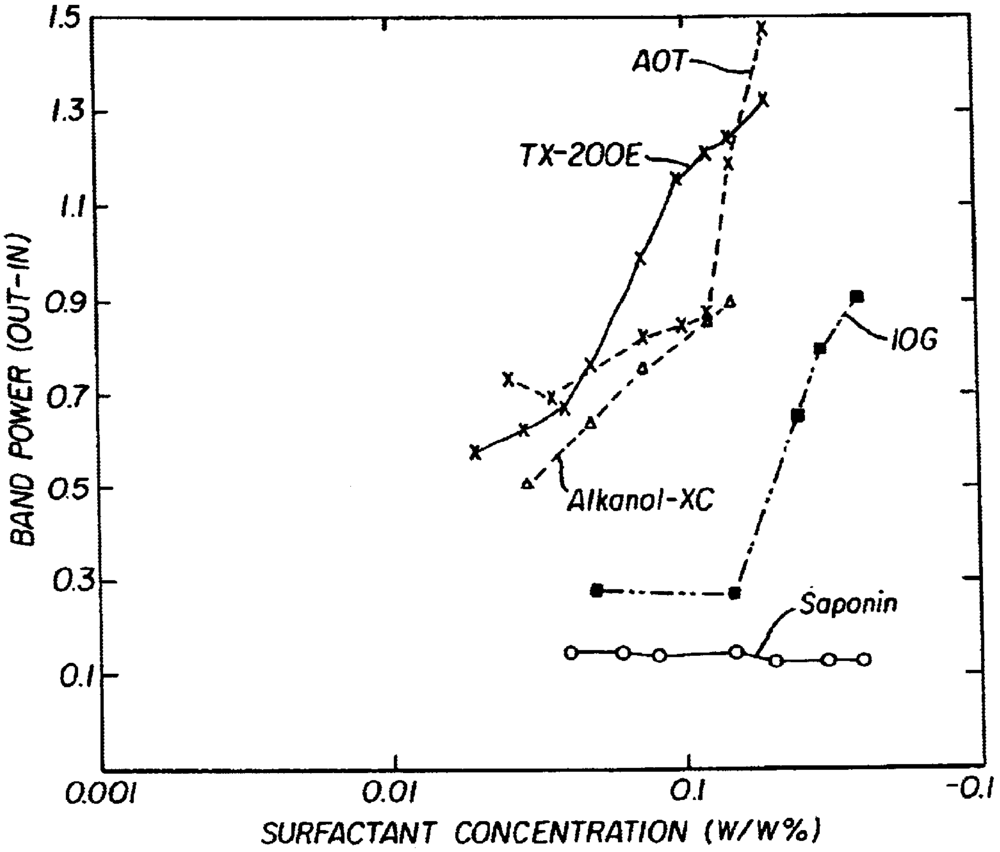
FIG. 15 is a plot of experimental measurements of coating thickness non-uniformity caused by air blowing through a perforated plate and impinging on a wet coating, previously applied to a support, for different concentrations and types of surfactant.

In the first of these applications, three layers were applied simultaneously on a clear substrate. The middle layer contained a carbon dispersion to provide optical density. Air was blown onto the coated side of the substrate through a perforated plate, which causes the coating to flow. This is demonstrated by the variability of the optical density of the coating and, according to Beer's Law, this variability in optical density can be directly related to the variability in the thickness of the middle layer. In these experiments, the concentration of the surfactant placed in the top layer is the only parameter that was changed. All other parameters were held constant. This includes the viscosity of the coating liquid as delivered to the coating hopper, the thickness of the coated layers, the speed of the substrate on which the coating was applied, the flow rate of the air through the perforated plate, and the dimensions and the distance of the perforated plate from the wet substrate. The method of measuring the optical density variations was very similar to the method that was applied previously to measure disturbances in the curtain. However, the frequency range of the power spectrums considered here corresponded to wavelengths of mottle disturbances having a size scale in the range of from about 1.25 cm to about 5 cm, and these measurements were recorded simultaneously at both ends (in the coating direction) of the perforated plates. The measurement at the start of the perforated plate is taken to eliminate from the measurement at the end of the perforated plate optical density variations that may exist in the coating before it is subjected to the blowing air. Therefore, the variability of the coating thickness, caused by the air blowing on the wet coating, is estimated as the difference between the variances in the power spectrums (in the mentioned limited frequency range) of the two signals. This measurement is named "Band power (out-in)" and is shown in FIG. 15 for a series of surfactant concentration levels and for surfactants A, C, and D of the Table below. The experiment performed to generate the data presented in FIG. 15 was not carried to the point of yielding optimum surface concentration of surfactant. However, the plots demonstrate very well the trend that increasing surfactant concentration beyond optimum concentration increases the non-uniformity caused by air disturbances.

TABLE

List of Surfactants Tested

| Label | Commercial Name |
|---|---|
| A | Triton X-200 |
| B | Zonyl FSN |
| C | Olin 10G |
| D | Alkanol XC |
| E | Aerosol OT |

Figure 16:
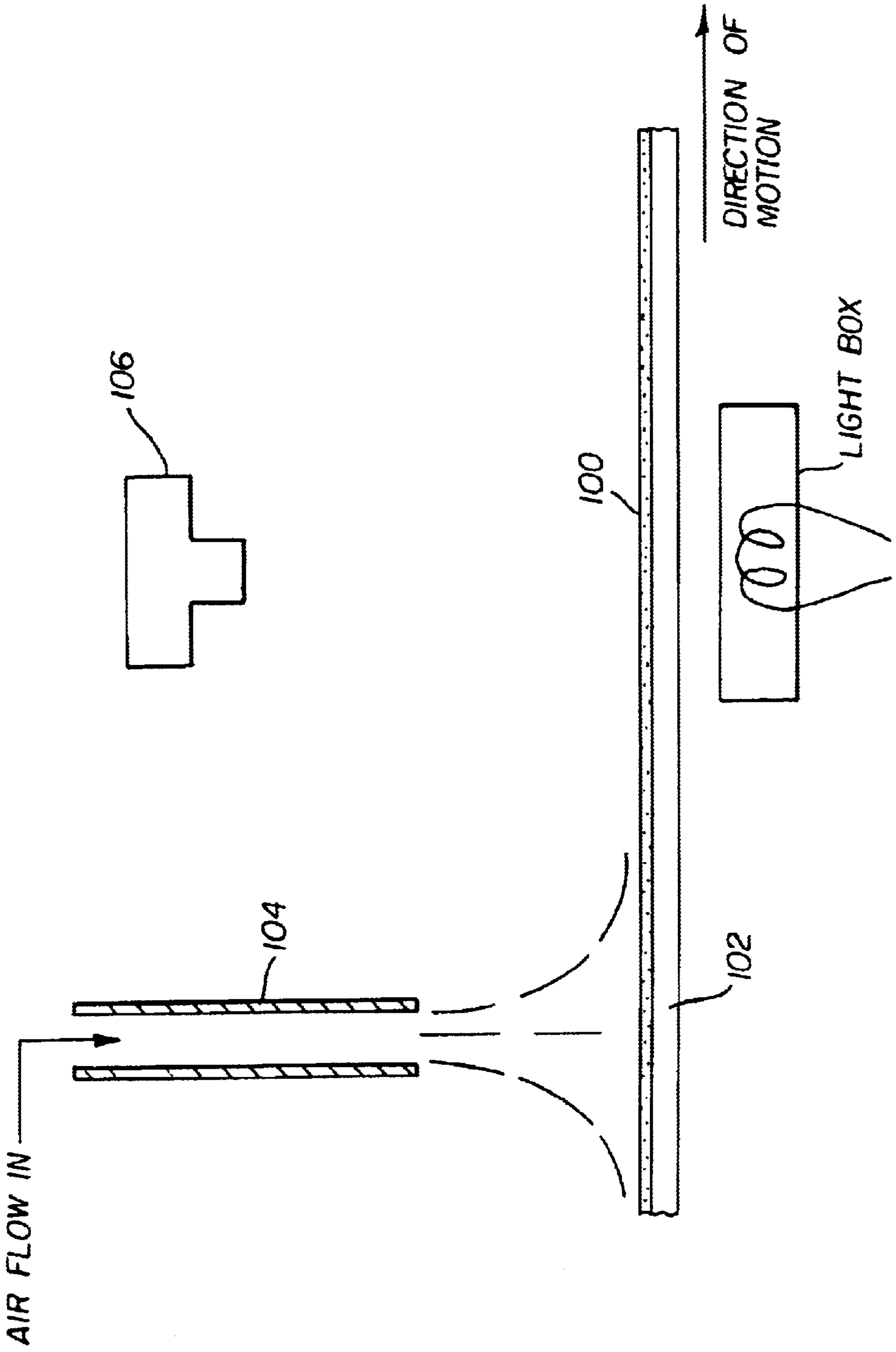
FIG. 16 is a schematic side elevational view of a test set-up for an experiment that demonstrates the ability of the method of the present invention to predict the surfactant concentration that minimizes the effect of blowing air on a coated substrate.
Figure 17:
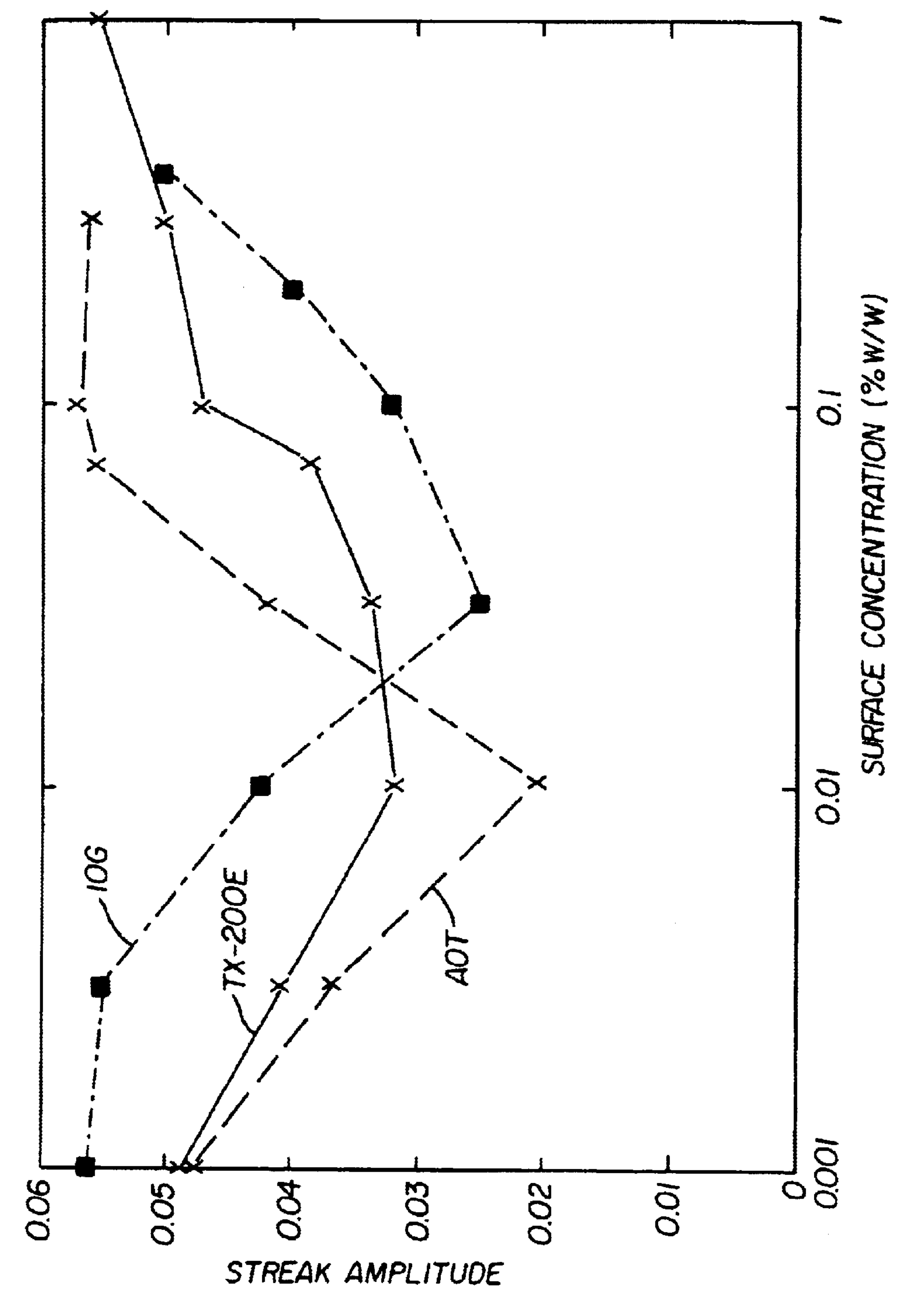
FIG. 17 is a plot of experimental measurements of the amplitude of streaks formed by an air jet impinging on a wet coating, previously applied to a substrate, for different concentrations and types of surfactant.

Next is described another experiment that demonstrates the ability of the method of this invention to predict the surfactant concentration that minimizes the effect of blowing air on a coated substrate. Referring to FIG. 16, a gelatin coating 100 containing a carbon dispersion was applied to a moving substrate 102 and a stationary jet 104 directed air at the wet gelatin coating 100 on the substrate 102. The impinging air from jet 104 formed a streak in the coating 100 that was measured from an image taken with a digital camera 106 shortly after the impingement area. A light 108 was provided on the underside of the web 102 to back light the area being imaged with the digital camera 106. The streak had been caused by a thickness variation in the coating that was measured from the image by appropriately applying Beer's Law. The following parameters were kept constant: the coating's wet thickness, the speed of the coated substrate, the stationary jet 104 and its position, and the flow rate of air exiting stationary jet 104. Surfactant was mixed, in differing amount or type, into a container that held a small amount of the aqueous gelatin solution with carbon dispersion. This solution came from a batch that had been prepared previously for use throughout the test. FIG. 16 shows the resulting thickness variation for the different surfactants in terms of their concentration. The thickness variation is given as the "Streak amplitude", which is the variation in the coated layer thickness through the breadth of the streak, divided by the average thickness of the coating. The curves of streak amplitude for the different surfactants and the concentration levels for the minimum streak amplitude shown in FIG. 16 compare remarkably well with those of the surfactant gradients shown in FIGS. 9, 11, and 12.

Surprisingly, the method also appears to apply to streaks formed on the slide in the layers of a film with multiple layers, even when the streaks are produced by other means than air disturbances. Such streaks may, for example, be caused by obstructions in the slots or on the slide surface of the coater.

From the foregoing, it will be seen that this invention is one well adapted to obtain all of the ends and objects hereinabove set forth together with other advantages which are apparent and which are inherent to the apparatus.

It will be understood that certain features and sub-combinations are of utility and may be employed with reference to other features and sub-combinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List:

| | | | |
|---|---|---|---|
| 10 | prior art application | 50 | exemplary apparatus |
| 12 | shallow vessel | 52 | coating die |
| 14 | static pool | 54 | enclosure |
| 16 | blade | 56 | backing roller |
| 18 | hook | 58 | web |
| 20 | free surface | 60 | exhaust ports |
| 22 | forming meniscus | 62 | exhaust ports |
| 24 | measuring apparatus | 64 | coating composition |
| 26 | vessel | 66 | die lip |
| 28 | pump | 68 | freefalling curtain |
| 30 | liquid | 70 | composite layer |
| 32 | upper edge | 72 | disturbance generator |
| 34 | circumferential gutter | 74 | air currents |
| 26 | reservoir | 100 | gelatin coating |
| 38 | surface | 102 | substrate |
| 40 | upper curve | 104 | stationery jet |
| 42 | lower curve | 106 | digital camera |
| 44 | inflection point | 108 | light |
| 46 | curve minimum | | |

What is claimed is:

1. A method for determining the optimal surface-leveling concentration of a surfactant in a composition for coating to a web comprising the steps of:

a) formulating a plurality of test samples of the composition, each of the test samples having a different bulk concentration of the surfactant;

b) determining a dynamic surface tension value for each of the test samples;

c) fitting the dynamic surface tension values as a function of concentration to a best-fit algorithm;

d) determining a maximum slope of the best-fit algorithm, the maximum slope corresponding to a maximum value of surface tension gradients; and e) determining a concentration of surfactant corresponding to the maximum surface tension gradient.

2. A method as recited in claim 1 wherein the dynamic surface tension determining step is performed using an overflowing weir apparatus.

3. A method as recited in claim 2 wherein the overflowing weir apparatus includes means for pumping each of the samples individually and an overflowing weir to provide a continuously expanding free surface of the composition.

4. A method as recited in claim 1 wherein:

the best-fit algorithm is a least squares algorithm.

5. A method as recited in claim 1 wherein:

the best-fit algorithm is a least square fit of an equation of similar form to the Carreau equation used to describe rheological behavior in liquids:

$$\frac{\sigma-\sigma_\infty}{\sigma_o-\sigma_\infty}=\frac{1}{[1+(\lambda c)^a]^{\frac{(1-n)}{a}}} \tag{1}$$

where

| | |
|---|---|
| $\sigma$ | dynamic surface tension |
| $\sigma_o$ | maximum dynamic surface tension (attained in the absence of surfactant) |
| $\sigma_\infty$ | minimum dynamic surface tension (attained in the presence of an over saturation of surfactant) |
| c | bulk surfactant concentration |
| $\lambda$ | fitted parameter |
| a | fitted parameter |
| n | slope parameter determined by fitting data. |

6. A method as recited in claim 1 further comprising the steps of:

(a) formulating a liquid coating composition having the concentration of surfactant corresponding to about the maximum surface tension gradient; and (b) coating the liquid coating composition onto a moving web.

7. A method of coating a moving web with a composite layer of at least one coating composition wherein at least one of a top or a bottom layer thereof has an optimal surface-leveling concentration of surfactant therein, the method comprising the steps of:

(a) formulating a plurality of test samples of the composition, each of the test samples having a different bulk concentration of the surfactant;

(b) determining a dynamic surface tension value for each of the test samples;

(c) fitting the dynamic surface tension values as a function of concentration to a best-fit algorithm;

(d) determining a maximum slope of the best-fit algorithm, the maximum slope corresponding to a maximum value of surface tension gradients;

(e) determining a concentration of surfactant corresponding to the maximum surface tension gradient;

(f) formulating a liquid coating composition having the concentration of surfactant corresponding to about the maximum surface tension gradient; and (g) coating the liquid coating composition onto a moving web.

8. A method as recited in claim 7 wherein:

the best-fit algorithm is a least squares algorithm.

9. A method as recited in claim 7 wherein: the best-fit algorithm is a least square fit of an equation of similar form to the Carreau equation used to describe rheological behavior in liquids:

$$\frac{\sigma-\sigma_\infty}{\sigma_o-\sigma_\infty}=\frac{1}{[1+(\lambda c)^a]^{\frac{(1-n)}{a}}} \tag{1}$$

where $\sigma$ dynamic surface tension $\sigma_o$ maximum dynamic surface tension (attained in the absence of surfactant) $\sigma_\infty$ minimum dynamic surface tension (attained in the presence of an over saturation of surfactant)

c bulk surfactant concentration $\lambda$ fitted parameter a fitted parameter n slope parameter determined by fitting data.

* * * * *